May 25, 1937. W. J. LAUER 2,081,671
FISH LURE
Filed April 28, 1936
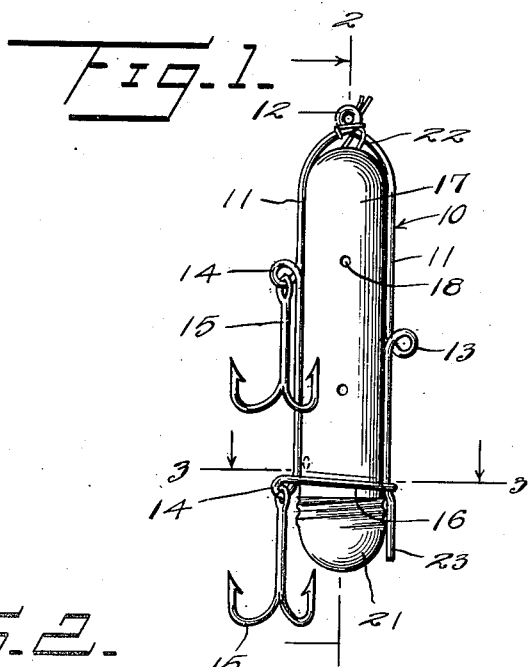
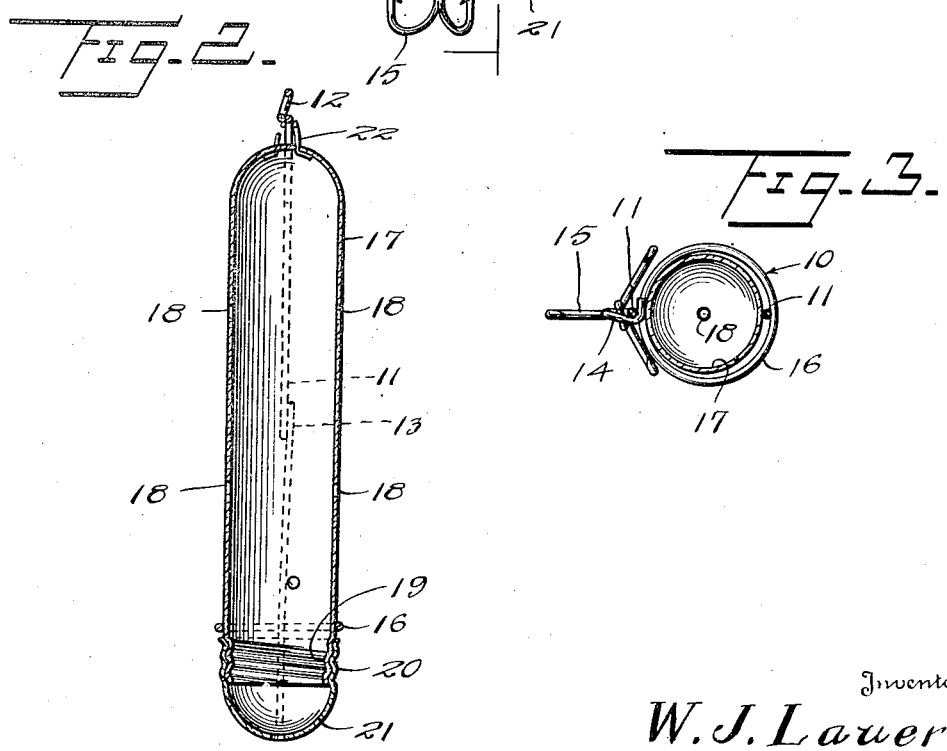
Inventor
W. J. Lauer Patented May 25, 1937

2,081,671

UNITED STATES PATENT OFFICE 2,081,671

FISH LURE

William J. Lauer, Argyle, Minn.

Application April 28, 1936, Serial No. 76,813

2 Claims. (Cl. 43—41)

This invention relates to a fish lure and it aims to provide a novel construction wherein a live minnow or other live bait will be retained within a transparent capsule or the like and which capsule is perforated to permit a flow of water therethrough to maintain the minnow alive.

It is further aimed to provide a novel structure wherein the capsule has means for attaching it to a harness or frame and also has a separable closure in combination with means on the harness to guard the same against removal by fish.

It is still further aimed to provide a structure which is light in weight and which may be used for casting and trolling and also be used for still fishing.

The additional objects and advantages will become apparent from a consideration of the description following taken in connection with accompanying drawing illustrating an operative embodiment.

In said drawing:—

Figure 1 is a view in elevation illustrating the improved fish lure;

Figure 2 is a vertical sectional view taken on the line 2—2 of Figure 1; and

Figure 3 is a horizontal cross sectional view taken on the line 3—3 of Figure 1.

Referring specifically to the drawing wherein like reference characters designate like or similar parts, the invention consists of a suitable harness or frame 10, which is generally of U-shape and preferably made from metallic wire bent into the desired form and for instance so as to have side members 11, an eyelet 12 at the junction of the side members, and an eyelet 13 substantially midway of the ends of one of the side members. The line, in the case of casting and trolling, is adapted to be fastened to the eyelet 12 while such line in the case of still fishing is adapted to be fastened to the eyelet 13. Additional eyelets are provided on the harness or frame as at 14, to which hooks 15 of any suitable design are pivotally connected. The lower end of one of the arms 11 is formed into a ring 16 which surrounds the opposite arm and is preferably soldered or otherwise connected thereto.

A very important feature of the present invention is a capsule 17 adapted to retain a minnow or other live bait. This capsule has any desired number of perforations at 18 so that water may readily flow therethrough in order to keep the bait alive. The lower end of the capsule is open and provided with integral screw threads as at 19 which are engaged by integral screw threads 20 on a closure cap 21. The capsule 17 and its cap 21 are preferably made of a transparent or translucent material, and for instance celluloid or any equivalent thereof. The capsule fits removably and friction tight within the ring 16 and between the arms 11 and in addition at the upper end, has a tethering element 22 fastened thereto in any desired manner and of a length to permit tying or fastening through the eyelet 12 or an adjacent part of the harness 10. The tethering element 22 may be metallic wire, a cord or otherwise.

To guard against the danger of fish particularly nibbling at the cap end 21 and perhaps rupturing the capsule and releasing the lure, one side 11 is extended to provide a guard 23 projecting across and relatively close to the screw threads 20.

Various changes may be resorted to provided they fall within the spirit and scope of the invention.

I claim as my invention:—

1. A fish lure, comprising a U-shaped harness providing side members, a ring on the terminal of one side member and embracing the other side member, a diaphanous capsule adapted to contain live bait disposed within the harness and ring, fastening means on the capsule secured to the harness, said capsule being open at one end and provided with screw threads, and a threaded cap to close said capsule, the other of said side members having its terminal extended beyond said embracing ring and providing a guard for said cap.

2. A fish lure of the class described comprising a generally U-shaped harness providing side members, an eyelet at the junction of the side members, an eyelet substantially midway of the ends of one of the side members for attachment of a line thereto selectively with the first mentioned eyelet, one side member having a ring embracing the other side member, a fish hook carried by the harness, a diaphanous perforated capsule adapted to contain live bait disposed within the harness and embraced by said ring, fastening means on the capsule secured to the harness, and a screw threaded cap on one end of the capsule, one of said side members being extended across the screw threads to constitute a guard.

WILLIAM J. LAUER.